United States Patent
Hütte et al.

[11] Patent Number: 5,969,008
[45] Date of Patent: Oct. 19, 1999

[54] CHLORINE-RESISTANT ELASTANE FIBRES

[75] Inventors: Stephan Hütte, Köln; Rolf-Volker Meyer, Leverkusen; Hans-Joachim Wollweber, Krefeld; Karin-Anke Heinrich, Dormagen, all of Germany

[73] Assignee: Bayer Aktiengesellschaft, Leverkusen, Germany

[21] Appl. No.: 08/960,564

[22] Filed: Oct. 30, 1997

[30]     Foreign Application Priority Data

Nov. 18, 1996 [DE] Germany ............................ 196 47 571

[51] Int. Cl.[6] ....................................... C08K 3/00
[52] U.S. Cl. .......................... 523/206; 523/209; 523/216; 524/436; 524/437; 524/442; 524/444; 524/451
[58] Field of Search ..................................... 523/206, 209, 523/216; 524/436, 437, 442, 444, 451

[56]     References Cited

U.S. PATENT DOCUMENTS

| | | | |
|---|---|---|---|
| 4,340,527 | 7/1982 | Martin | 524/432 |
| 5,028,642 | 7/1991 | Goodrich et al. | 524/27 |
| 5,447,969 | 9/1995 | Kojima et al. | 523/200 |
| 5,741,526 | 4/1998 | Miyata | 424/635 |

FOREIGN PATENT DOCUMENTS

| | | | |
|---|---|---|---|
| 0489395 | 6/1992 | European Pat. Off. | D06P 1/651 |
| 0558758 | 9/1993 | European Pat. Off. | C08L 75/04 |

*Primary Examiner*—Edward J. Cain
*Attorney, Agent, or Firm*—Sprung Kramer Schaefer & Briscoe

[57]     ABSTRACT

The invention relates to polyurethane compositions and especially to elastic polyurethane fibers resulting therefrom which can be employed for swimwear in aqueous, chlorine-containing environments such as swimming pools, for example. The invention relates in particular to polyurethane compositions and especially to elastic polyurethane fibers resulting therefrom that contain hydrotalcites and/or other basic metal aluminium hydroxy compounds coated with polyorganosiloxane or with a mixture of polyorganosiloxane and polyorganohydrogensiloxane.

24 Claims, No Drawings

CHLORINE-RESISTANT ELASTANE FIBRES

The invention relates to polyurethane compositions and especially to elastic polyurethane fibres resulting therefrom which can be employed for swimwear in aqueous, chlorine-containing environments such as swimming pools, for example. The invention relates in particular to polyurethane compositions and especially to elastic polyurethane fibres resulting therefrom that contain hydrotalcites coated with polyorganosiloxane or with a mixture of polyorganosiloxane and polyorganohydrogensiloxane and/or contain other basic metal aluminium hydroxy compounds.

The expression "fibres" that is used within the scope of the present invention includes staple fibres and/or continuous filaments which can be produced by spinning processes that are known in principle—for example, the dry-spinning process or the wet-spinning process, as well as melt spinning.

The invention further relates to the use of special magnesium aluminium hydroxycarbonates as auxiliary or additive substances for polymers, in particular for polyurethane.

Elastic polyurethane fibres consisting of long-chain, synthetic polymers, at least 85% of which are synthesised from segmented polyurethanes based on, for example, polyethers, polyesters and/or polycarbonates, are well-known. Yarns consisting of such fibres are used for the production of fabrics or materials which in turn are suitable, inter alia, for corsetry, hosiery and sportswear such as, for example, swimming costumes or swimming trunks. However, in swimming pools the water is frequently so strongly chlorinated for reasons of hygiene that the active-chlorine content usually amounts to between 0.5 and 3 ppm (parts per million) or even more. If polyurethane fibres are exposed to such an environment this can result in degradation or impairment of the physical properties of the fibres such as, for example, their strength, and, due to this, premature textile wear.

In practical respects, in the case of fibres of coarse titre a certain degradation of the fibres can be tolerated without the effects thereof being noticed by the user of the fabrics produced from these fibres. Nevertheless, an improvement in the resistance of the fibrous material to chlorine-induced degradation is necessary, in particular for yarns having a high degree of fineness (for instance, fibres with a titre of less than 150 denier).

With a view to improving the resistance to chlorinated water of elastic polyurethane yarns for the field of application constituted by swimwear, the polyurethanes have frequently been produced from polyesters in the form of a low-molecular monohydroxyfunctional, dihydroxyfunctional or polyhydroxyfunctional polymer. However, aliphatic polyesters display high biological activity. For this reason the polyurethanes produced from this polymer have the disadvantage that they are easily degraded by microbes and moulds. Furthermore it has been shown that the resistance to chlorinated water of polyurethanes based on polyesters is not satisfactory.

A large number of additives in elastane fibres have been described in order to improve the resistance to chlorinated water of elastic polyurethane filaments.

In patents U.S. Pat. No. 4,340,527, DE 3 124 197 and US 5,028,642 the incorporation of zinc oxide into filaments consisting of segmented polyurethanes is described for the purpose of chlorine stabilisation. However, zinc oxide has the serious drawback that during the process for dyeing the fabrics, in particular under acidic conditions (pH 3 to 4), it is washed out of the filament. As a result, the resistance to chlorinated water of the fibres is considerably reduced. Moreover, bacteria cultures in biologically active clarification plants are killed off by the waste waters containing zinc that arise from the dyeing process. Consequently the mode of operation of such clarification plants can be severely impaired.

In published application JP 59-133 248 the incorporation of hydrotalcite into filaments consisting of segmented polyurethanes is described with a view to improving their resistance to chlorinated water. In addition to the stabilisation that is free from heavy metal, it is stated that only small quantities of dispersed hydrotalcite are washed out under dyeing conditions in the acidic range (pH 3 to 4) and consequently a good resistance to chlorinated water is preserved. However, by way of disadvantage it is revealed that hydrotalcite agglomerates strongly in polar solvents such as dimethylacetamide or dimethylformamide and even in spinning solutions for polyurethane fibres. Agglomerates in spinning solutions for polyurethane fibres lead rapidly to clogging of the spinning nozzles during the spinning process, as a result of which the spinning process often has to be interrupted on account of frequently breaking fibres and increasing pressure at the spinning nozzles. Spinning of such PU compositions over a relatively long period is consequently not possible with this process. In addition, such filaments do not exhibit adequate resistance to water that contains chlorine.

In published application JP 3-292 364 hydrotalcites coated with silanes and/or fatty acids are described by way of additive in polyurethanes. However, it has been found that the resistance to chlorinated water of the spandex fibres described is not adequate. Furthermore, silanes have the disadvantage that they are coating agents which are costly to produce. A further disadvantage is that the colourability of the described polyurethane fibres by means of acid dyestuffs such as Telon dyes in the course of the processing with polyamide hard fibres is not adequate and furthermore a tone-to-tone dyeing, for example of mixed fabrics, between polyurethane fibres and polyamide hard fibres is not possible.

In published application EP 558 758 a polyurethane composition is described that contains a hydrotalcite containing water of crystallisation with adherent fatty acid. A disadvantage of this composition is the same as that of the composition already described in connection with JP-292 364—i.e., that the resistance to chlorinated water of the polyurethane fibres described is still not adequate, the colourability of the described polyurethane fibres by means of acid dyestuffs such as Telon dyes in the course of the processing with polyamide hard fibres is not adequate, and a tone-to-tone dyeing between mixed fabrics consisting, for example, of polyurethane fibres and polyamide hard fibres is not possible.

The object underlying the invention is to make available a PU composition in particular for polyurethane fibres (also called elastane fibres), which possesses a resistance to chlorinated water that is improved in comparison with the state of the art, the chlorinated-water stability of which is preferably not achieved by addition of additives containing heavy metal, the stabiliser of which does not have a negative influence on either the spinning process or the physical properties of the polyurethane fibre, the stabiliser of which, in particular also in the case of special treatments of the fibre such as washing or dyeing, is not washed out of the fibre and/or does not become ineffective, the colourability of which by means of acid dyestuffs such as Telon dyes in the course of the processing with polyamide hard fibres remains at least the same or is even improved and with which in particular a tone-to-tone dyeing between the polyurethane fibre and polyamide hard fibre is obtained.

According to the invention this object is achieved by an effective quantity of finely divided hydrotalcites and/or other basic metal aluminium hydroxy compounds that are coated with polyorganosiloxanes or a polyorganosiloxane/polyorganohydrogensiloxane combination being added to the polyurethane composition.

A subject of the invention is constituted by polyurethane compositions and elastane fibres having increased chlorine resistance and consisting in particular of at least 85 % segmented polyurethane, characterised in that the polyurethanes or polyurethane fibres contain finely divided hydrotalcites or other basic metal aluminium hydroxy compounds in particular of the general formula (1)

$$M_{1-x}^{2+}Al_x(OH)_2A_{x/n}^{n-}\cdot mH_2O \qquad (1)$$

wherein $M^{2+}$ stands for magnesium or zinc, in particular magnesium, $A^{n-}$ is an anion having valency number n and selected from the group comprising $OH^-$, $F^-$, $Cl^-$, $Br^-$, $CO_3^{2-}$, $SO_{42-}$, $HPO_4^{2-}$, silicate, acetate or oxalate, in particular $CO_3^{2-}$, $0 < x \leq 0.5$ and $0 \leq m < 1$, or in particular of the formula (2)

$$Mg_sAl_t(OH)_u(A^{2-})_v\cdot wH_2O \qquad (2)$$

wherein s is a number from 1 to 15, t is a number from 1 to 8, u is a number from 1 to 40, v is a number from 1 to 5 and w is a number from 0 to 20 and $A^{2-}$ is an anion selected from the group comprising $CO_3^{2-}$, $SO_4^{2-}$, $HPO_4^{2-}$, silicate or oxalate, in particular $CO_3^{2-}$, whereby the hydrotalcites or basic metal aluminium hydroxy compounds are coated with 0.1 to 30 wt. %, in particular with 0.5 to 25 wt. %, polyorganosiloxanes and/or polyorganohydrogensiloxanes.

Basic metal aluminium hydroxy compounds in the sense of the invention are mixed salts based on a divalent metal ion, in particular Mg or Zn, Mg being particularly preferred, and aluminium by way of trivalent cation, the hydroxy anion and another monovalent or divalent anion, in particular $OH^-$, $F^-_1$, $Cl^-$, $Br^-$, $CO_3^{2-}$, $SO_4^{2-}$, $HPO_4^{2-}$, silicate, acetate or oxalate.

The quantity of the hydrotalcite and/or basic metal aluminium hydroxy compound which is contained in finely divided form in the polyurethane composition or the filaments that can be produced therefrom amounts in particular to between 0.05 wt. % and 15 wt. %, preferably between 0.1 wt. % and 5 wt. %, and in particular between 0.3 wt. % and 4 wt. %, relative to the weight of the polymer. In the case of the elastane filaments the quantity may be distributed within the filaments and/or on the surface of the filaments.

In the case of the hydrotalcites or metal aluminium hydroxy compounds, it is a matter, in particular, preferably of those types such as are shown in formulae (3) and (4).

$$Mg_5Al_3(OH)_{15}(A^{2-})_2\cdot wH_2O \qquad (3);$$

$$Mg_6Al_2(OH)_{12}(A^{2-})_3\cdot wH_2O \qquad (4)$$

in which $A^{2-}$ and w have the significance specified above with reference to formula (2).

Magnesium compounds are preferred, on account of the aforementioned problem of waste water in connection with the dyeing of fibres containing Zn.

Particularly preferred examples of the hydrotalcites or basic magnesium aluminium hydroxycarbonates are those having the formulae (5), (6) and (7):

$$Mg_6Al_2(OH)_{16}CO_3\cdot 5H_2O \qquad (5);$$

$$Mg_4Al_2(OH)_{12}CO_3\cdot 4H_2O \qquad (6);$$

$$Mg_6Al_2(OH)_{12}(CO_3)_3\cdot 7H_2O \qquad (7).$$

With a view to making the hydrotalcites or metal aluminium hydroxy compounds water-repellent, the described polyorganosiloxanes are employed with a content of 0.1 to 30 wt. %, relative to the hydrotalcite or the metal aluminium hydroxy compound. Preferred are polyorganosiloxanes of the general formula (8).

$$(R^5)_3SiO-(-SiR^1R^4O-)_x-(-SiR^2R^7O-)_y-(-SiR^3HO-)_z-Si(R^6)_3 \qquad (8)$$

wherein x is a number from 0–500, y is a number from 0–300 and z is a number from 0–300, the residues $R^1$, $R^2$, $R^3$, $R^4$, $R^5$ and $R^6$ independently of one another stand for a saturated and/or unsaturated, optionally also branched, alkyl residue having 1 to 4 C atoms and/or for an aryl residue having 6 to 9 C atoms which is optionally also alkyl-substituted and $R^7$ stands for an alkyl residue having 6 to 18 C atoms or for hydrogen.

Polysiloxanes of the formula (8) have particularly advantageous properties if in the general formula (8) the residues $R^1$, $R^2$, $R^3$, $R^4$, $R^5$ and $R^6$ stand for the methyl group.

In particularly preferred manner, use is made of hydrotalcites and/or metal aluminium hydroxy compounds coated with polyorganosiloxanes of the formula (8) in which x signifies a number from 0 to 100, y signifies a number from 0 to 100 and z signifies a number from 0 to 100, whereby x+y+z stands for a number from 25 to 300.

Polyorganosiloxanes are likewise preferred if in the general formula (8) for the polyorganosiloxanes x=0, y=5 to 50 and z=5 to 60, whereby y+z is greater than 15.

Preferred furthermore are polyorganosiloxanes of the general formula in which x is a number from 3 to 500, y=0 and z=0.

In the terminal groups the residues $R^5$ and $R^6$ may in each instance also stand for different substituents, which means that different substituents may also be bonded at terminal silicon atoms.

The residues $R^7$ may be straight-chained and/or branched alkyl residues. Examples of straight-chained residues $R^7$ are hexyl, octyl, nonyl, decyl, dodecyl and tetradecyl residues, examples of branched alkyl residues are 3-methylpentyl, 2,3-dimethylbutyl, 3-butylhexyl and 4-propyloctyl residues. In this connection the polyorganosiloxanes may in each instance contain the same or different residues $R^7$. Preferred alkyl residues $R^7$ are the dodecyl and tetradecyl residue, in particular also mixtures of compounds having both residues.

Preferred polyorganohydrogensiloxanes are those of the formulae

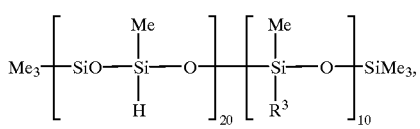
(9)

in which the residue $R^8$ signifies $C_{12}H_{25}$ and/or $C_{14}H_{29}$ and

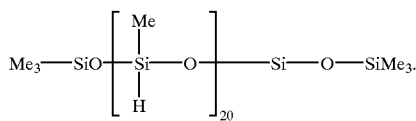
(10)

Preferred polyorganosiloxanes are those of the formulae

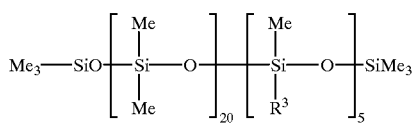
(11)

in which the residue $R^9$ signifies $C_{12}H_{25}$ and/or $C_{14}H_{27}$ and

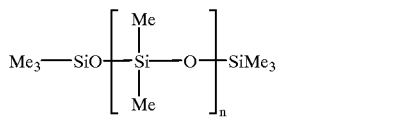
(12)

with n=2 to 100.

In the case where use is made of the mere polyorganosiloxanes for the coating, residues of hydrogen directly bonded to Si that are caused by the production process have a favourable effect on the agglomeration behaviour of the hydrotalcites.

Another preferred subject of the invention is constituted furthermore by elastane fibres with metal aluminium hydroxy compounds that are coated with a mixture of the aforementioned polyorganosiloxanes and polyorganohydrogensiloxanes of the general formula (13):

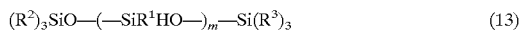
(13)

whereby in the general formula (13) m is a number from 5 to 200 and the residues $R^1$, $R^2$, $R^3$ independently of one another have the significance specified in connection with the definition of the residues of formula (8) and whereby polyorganosiloxanes and polyorganohydrogensiloxanes are preferably present in a weight ratio between 4:1 and 1:4.

Preferred are such hydrotalcites and/or basic metal aluminium hydroxy compounds which are coated with 0.05 to 25 wt. % polyorganosiloxane or the mixture of polyorganosiloxane and polyorganohydrogensiloxane, relative to the quantity of hydrotalcite or metal aluminium hydroxy compound. In particular, use is preferably made of hydrotalcites and/or metal aluminium hydroxy compounds that are coated with from 0.5 to 10 wt. % polyorganosiloxane or the polyorganosiloxane/polyorganohydrogensiloxane mixture.

The coating of the hydrotalcites and/or basic metal aluminium hydroxy compounds may be effected by spraying and/or intermixing of the polyorganosiloxane or of the polyorganosiloxane/polyorganohydrogensiloxane mixture jointly or separately in arbitrary sequence, preferably prior to and/or during a final grinding of the hydrotalcite.

In this connection it is immaterial whether the polyorganosiloxane or the polyorganosiloxane/polyorganohydrogensiloxane mixture is admixed to the moist filter cakes, pastes or slurries that accumulate in the course of the production of the hydrotalcites and/or basic metal aluminium hydroxy compounds prior to drying or whether it is added in suitable manner, for instance by spraying, to the dry material immediately prior to the final grinding or, in the case of steam-jet drying, is added directly to the steam when it is being fed into the jet mill. The polyorganosiloxane or the polyorganosiloxane/polyorganohydrogensiloxane mixture may optionally be converted into an emulsion prior to the addition.

Production of the hydrotalcites or of the metal aluminium hydroxy compounds is effected, for example, in accordance with fundamentally known processes. Such processes are described, for example, in published applications EP 129 805 A1 or EP 117 289 A1.

Production of the hydrotalcites and/or, for example, of magnesium aluminium hydroxycarbonates is preferably effected from their parent compounds, for example from $MgCO_3$, $Al_2O_3$ and water in the presence of a solvent such as, for example, water, of a $C_{1-8}$ alcohol or of chlorinated hydrocarbons with subsequent drying by, for example, spray drying and grinding by means of, for example, a bead mill.

In particularly preferred manner the coating of the hydrotalcites and/or basic metal aluminium hydroxy compounds is effected by grinding with, for example, a bead mill in the presence of solvents such as, for example, dimethylacetamide, dimethylformamide or dimethylsulphoxide, such as may also be employed in connection with the production of the polyurethane. The polyorganosiloxane or the polyorganosiloxane/polyorganohydrogensiloxane mixture that is used for the coating may be added in suitable manner to the material to be ground or, as already described above, may be added to the hydrotalcite and/or to the metal aluminium hydroxy compound prior to the drying process or in the course thereof. In the course of grinding, in particular mean grain sizes of the coated hydrotalcites or basic metal aluminium hydroxy compounds having a mean diameter (number average) of 10 $\mu$m and less are achieved, preferably smaller than 5 $\mu$m and in particular smaller than 2 $\mu$m. These grain sizes are achieved by processing of the hydrotalcites and/or basic metal aluminium hydroxy compounds by means of the processes already named above.

The hydrotalcites and/or basic metal aluminium hydroxy compounds may be added to the polyurethane at any point in the production of polyurethane fibres. For instance, the hydrotalcites and/or metal aluminium hydroxy compounds may be added in the form of a solution or slurry to a solution or dispersion of other fibre additives and then, upstream with respect to the fibre-spinning nozzles, be intermixed with the polymer solution or injected into the latter. Of course, the hydrotalcites and/or metal aluminium hydroxy compounds may also be added separately to the polymer-spinning solution in the form of dry powders or in the form of a slurry in a suitable medium. The hydrotalcites and/or basic metal aluminium hydroxy compounds may furthermore be added, in the formulations named above, in the course of production of the polymer.

The polyurethanes or polyurethane fibres according to the invention may contain a large number of different additives for various purposes, such as, for example, delustering agents, fillers, antioxidants, dyestuffs, colorants, stabilisers against heat, light, UV radiation and fumes, etc, whereby these additives are dosed in such a way that they display no effects acting against the hydrotalcites and/or metal aluminium hydroxy compounds.

If the textile goods produced with the fibres according to the invention are finished or coloured, care should in particular be taken to ensure that a deactivation or dissolving-out of the hydrotalcites and/or metal aluminium hydroxy compounds from the fibre is avoided.

The polyurethanes that are stabilised by means of the hydrotalcites and/or metal aluminium hydroxy compound may, in addition to the working into fibres, also be employed for moulded articles, films, elastomers, foaming agents, etc.

Hydrotalcites and/or basic metal aluminium hydroxy compounds agglomerate in certain circumstances in polar solvents such as, for example, dimethylacetamide, dimethylformamide or dimethylsulphoxide which are ordinarily employed in the dry-spinning or wet-spinning process for the production of fibres from polyurethanes. Furthermore, agglomeration also occurs in solvent-free polymer melts that are employed for the production of melt-spun elastic fibres. For this reason, in the case of spinning solutions with incorporated hydrotalcites and/or metal aluminium hydroxy compounds, difficulties may arise during the spinning process as a consequence of clogging of the spinning nozzles, owing to which a strongly rising nozzle pressure results and breaking of fibres frequently occurs. In the case of incorporation of the hydrotalcites and/or metal aluminium hydroxy compounds into polyurethane solutions in accordance with the invention no agglomeration occurs in the spinning solution or polymer melt and the mean grain size of the hydrotalcites and/or basic magnesium aluminium hydroxycarbonates remains almost unchanged.

Accordingly, the resistance of filaments obtained in this way to degradation induced by chlorine-containing water is also improved in comparison with fibres obtained from spinning solutions or polymer melts that contain agglomerates.

Also a subject of the invention is a process for the production of polyurethane fibres in which a long-chain synthetic polymer by way of thermoplastic polyurethane is spun in the melt or a polymer having at least 85% segmented polyurethane is dissolved in an organic solvent such as dimethylacetamide, dimethylformamide or dimethylsulphoxide in a proportion of 15 to 50 wt. % with respect to the polyurethane, preferably in a proportion of 20 to 45 wt. % with respect to the polyurethane, and by virtue of spinning nozzles this solution is then formed into filaments by means of a dry-spinning or wet-spinning process, whereby an effective quantity of the hydrotalcites and/or metal aluminium hydroxy compounds from 0.05 wt. % to 15 wt. %, preferably a quantity from 0.1 wt. % to 5 wt. % and in particular a quantity from 0.3 wt. % to 4 wt. %, relative to the weight of the polymer, is distributed within the filaments and/or on the surface of the filaments. If less than 0.05 wt. % of the hydrotalcites and/or basic metal aluminium hydroxy compounds are distributed within the filament or on the surface of the filament, in certain circumstances the effectiveness against degradation of the polymer by chlorine is less satisfactory. The dispersion of substantially more than 15 wt. % of the hydrotalcites and/or metal aluminium hydroxy compounds within the filament or on the surface of the filament can lead to disadvantageous physical properties of the fibres and is therefore less advisable.

The hydrotalcites and/or metal aluminium hydroxy compounds such as described above that are particularly suitable for the polyurethane compositions according to the invention are preferably employed in the process.

The improved polyurethane fibres according to the invention consist of segmented polyurethane polymers such as, for example, those which are based on polyethers, polyesters, polyether esters, polycarbonates and the like. Fibres of this type may be produced in accordance with fundamentally known processes such as, for example, those which are described in U.S. Pat. Nos. 2,929,804, 3,097,192, 3,428,711, 3,553,290 and 3,555,115 or in publication WO 93/09174. Furthermore, the polyurethane fibres may consist of thermoplastic polyurethanes, the production of which is described, for example, in DE 44 14 327 (sic). Some of these polymers are more sensitive than others to chlorine-induced degradation. This is apparent, for instance, from a comparison of the results in Example 1 below. According to this example, polyurethane fibres consisting of a polyurethane based on polyether are significantly more sensitive than polyurethane fibres consisting of a polyurethane based on polyester. As is demonstrated in this example, in particular polyurethane fibres based on polyether benefit more than others from an addition of the hydrotalcites and/or basic metal aluminium hydroxy compounds. For this reason, polyurethane compositions and fibres are particularly preferred that comprise polyurethanes based on polyether.

In the case of the hydrotalcites or also in the case of basic magnesium aluminium hydroxy compounds it is a matter of additives which contain no heavy metal and which are harmless from a toxicological point of view and are therefore preferred. As a result it can be ensured that in the course of the continued processing of the elastane fibres, such as dyeing, for example, no waste waters arise which erode or ruin the mode of operation of a biologically active clarification plant.

As a result of the incorporation of the hydrotalcites and/or metal aluminium hydroxy compounds it is furthermore found, in particularly surprising manner, as shown in Example 2 below, that the colourability of the elastane fibre by means of acid dyestuffs such as Telon dyes is improved and a good tone-to-tone dyeing between elastane and polyamide fibres in the course of the processing with polyamide hard fibres can be achieved. This is particularly important if textile goods consisting of a mixture of elastane and polyamide fibres are to be darkly coloured. In addition it is possible to implement the dyeing process more quickly and/or to manage with less dyestuff in dye baths. At the same time the result of dyeing is of higher quality, since the elastane fibre receives a higher degree of colouring and the tone-to-tone dyeing with polyamide is improved.

The polyurethanes amongst which segmented polyurethanes are also numbered are produced in principle, in particular, from a linear homopolymer or copolymer each having a hydroxyl group at the end of the molecule and a molecular weight from 600 to 4,000, selected for example from the group comprising polyester diols, polyether diols, polyester amidodiols, polycarbonate diols, polyacrylic diols, polythioester diols, polythioether diols, polyhydrocarboxylic diols or a mixture or copolymer of compounds pertaining to this group. Moreover, the polyurethane is based in particular on organic diisocyanates and chain extenders having several active hydrogen atoms, such as, for example, diols and polyols, diamines and polyamines, hydroxylamines, hydrazines, polyhydrazides, polysemicarbazides, water or a mixture of these components.

A further subject of the invention is constituted by textile goods, in particular knitwear, hosiery or woven goods, produced by using the polyurethane fibres according to the invention, preferably in a mixture with synthetic hard fibres such as polyamide, polyester or polyacrylic fibres and/or natural fibres such as wool, silk or cotton.

The test processes described below are utilised for the purpose of measuring the various parameters that are required for appraisal of the advantages of the invention.

With a view to determining the maximum tensile-force extension and the breaking length, a simple tensile test is carried out on the elastane filament yarn in the air-conditioned state. The test method is carried out by following the model of DIN 53834 Part 1. The prepared test specimen is placed in a loop around the hook of the measuring head and around a 10-mm clasp with a prestressing force of 0.001 cN/dtex. The gauge length amounts to 200 mm. A vane consisting of aluminium foil is suspended precisely at the level of the light barrier. The slide travels at a deformation rate of 400%/minute (800 mm draw-off) until the filament breaks and then back again to its initial position after the measurement. 20 measurements are taken per test specimen.

In order to test the resistance of the elastane fibres to chlorine-induced degradation, a 60-cm-long yarn sample (for example with 4 filaments, total titre 40 denier) that was produced from the fibres is subjected to a "chlorinated-water fastness test" following the model of DIN 54019. In the course of this test the yarn is attached in stress-free manner with a length of 60 cm to special sample-holders. Prior to the actual "chlorinated-water fastness test" a blank dyeing at pH 4.5 (acetate buffer) at 98° C. is carried out over a period of one hour. The sample is then treated at room temperature 5 and 10 times, in each instance for one hour, in the dark in the test solution consisting of a buffer solution (51.0 ml 1.0 N NaOH, 18.6 g KCl and 15.5 g boric acid are dissolved in distilled water and topped up to 1,000 ml) and sodium hypochlorite solution with a chlorine content of 20 mg/l at pH 8.5. After each treatment the sample is washed with distilled water and dried in contact with the air. After conclusion of the 5-fold or 10-fold treatment the physical properties of the sample are measured as described in preceding paragraphs. The behaviour of the yarns in the course of this "chlorinated pool water test" corresponds to the behaviour of corresponding yarns in swimwear fabrics that are exposed to the chlorine which is present in swimming pools.

The chlorine concentration in the "chlorinated" water is defined here as that chlorine concentration which is capable of oxidising iodine ions to iodine. This concentration is measured by a titration with potassium iodide and sodium thiosulphate and is specified as ppm "active chlorine" ($Cl_2$) per liter of test solution. The titration process is carried out in such a way that 1 g potassium iodide, 2 ml phosphoric acid (85%) and 1 ml of a 10% starch solution are added to 100 ml chlorinated water that is to be analysed and the mixture is titrated with 0.1 N sodium-thiosulphate solution until a starch/iodine end-point is obtained.

The degree of colourability of spandex fibres by means of acid dyestuffs and the grade of the tone-to-tone dyeing of spandex and polyamide fibres in the course of the processing with polyamide hard fibres is measured by means of a spectrophotometer of the type Datacolor 3890. Calibration is undertaken by means of a white standard (barium-sulphate tile), the colour differences are determined by means of the Cie-Lab colour system.

The invention is elucidated further by means of examples given below, which, however, do not constitute a limitation, whereby all percentage figures relate to the total weight of the fibre unless otherwise stated.

EXAMPLES

In Examples 1 to 3 elastane fibres were produced from a polyether diol consisting of polytetrahydrofuran (PTHF) or from a polyester diol consisting of adipic acid, hexanediol and neopentyl glycol with an average molecular weight of 2,000. The diols were capped with methylene-bis(4-phenyl diisocyanate) (MDI) with a molar ratio of 1 to 1.7 and then chain-extended with a mixture consisting of ethylene diamine (EDA) and diethyl amine (DEA) in dimethylacetamide.

After this, a stock liquor of additives was admixed to the polymers. This stock liquor consisted of 62.6 wt. % dimethylacetamide (DMAC), 10.3 wt. % Cyanox 1790 (manufactured by American Cyanamid; stabiliser), 27.0 wt. % 30% spinning solution and 0.001 wt. % of the dyestuff Makrolexviolett (Bayer AG). This stock liquor was added to the spinning solution in such a way that in the finished fibre the content of Cyanox 1790 amounted to 1 wt. %, relative to the solids of the fibrous polymer.

To this spinning solution there was admixed a second stock liquor consisting of 30.9 wt. % titanium dioxide type RKB 2 (Bayer AG), 44.5 wt. % DMAC and 24.6 wt. % 22-% spinning solution in such a manner that a titanium-dioxide content of 0.05 wt. % resulted in the finished fibre, relative to the polyurethane-urea polymer.

To this spinning solution there was admixed a third stock liquor consisting of 13.8 wt. % of the hydrotalcites and/or metal aluminium hydroxy compounds specified in Table 1, 55.2 wt. % dimethylacetamide and 31.0 wt. % 30% spinning solution in such a manner that the content of hydrotalcites and/or metal aluminium hydroxy compounds specified in Table 1 resulted in the finished fibre, relative to the polyurethane-urea polymer.

To this spinning solution a further stock liquor was now admixed. It consisted of 5.4 wt. % magnesium stearate, 45.0 wt. % DMAC and 49.6 wt. % 30% spinning solution and was added in such a way that a content of magnesium stearate amounting to 0.20 wt. % resulted, relative to the solids of the fibrous polymer.

The finished spinning solution was dry spun by means of spinning nozzles in a typical spinning apparatus so as to form filaments having a titre of 10 dtex, whereby in each instance four individual filaments were combined to form coalescent filament yarns. The fibrous preparation, consisting of polydimethylsiloxane with a viscosity of 10 mPas/25° C., was applied with the aid of a preparation roller, whereby about 4 wt. % were applied, relative to the weight of the fibre. The fibre was then wound at a speed of 900 m/min.

Example 1

The test results of the measurements regarding the resistance of elastane fibres to chlorine-induced degradation are shown in Table 1. In this connection use was made of polyurethanes based on polyethers and polyesters, as well as diverse stabilisers and coating agents. It turns out that, in particular in the case of the samples 1-5, 1-9 and 1-11 according to the invention, the highest percentage of the original maximum tensile force is preserved. Consequently, with these samples the stability against chlorinated water is, as desired, very good.

Example 2

With a view to testing their colourability, the elastane fibres named in Tables 2 and 3 were dyed together with polyamide in a ratio of 20:80, in each instance in separate baths with acid dyestuffs in accordance with the dyeing formulations specified therein.

All dyeing processes were carried out in a Turbomat (manufactured by Ahiba) with a liquor ratio of 1:40.

The degree of colourability of elastane fibres and the grade of the tone-to-tone dyeing by means of acid dyestuffs in the course of the processing of elastane fibres with polyamide hard fibres was measured by means of a spectrophotometer of the type Datacolor 3890. Calibration of the instrument was undertaken by means of a white standard (barium-sulphate tile), the colour differences were determined by means of the Cielab colour system.

The grade of colourability is specified in Table 2 by means of the overall difference DE*. The further DE* varies from the reference sample into the positive range, the better is the colourability of the sample examined. A desired good colourability is consequently the case in particular for samples 2-4 and 2-5.

The grade of the tone-to-tone dyeing is specified in Table 3 likewise by means of the overall difference DE*. The smaller the difference of DE* between the sample and the reference sample, the better is the tone-to-tone dyeing of the sample examined. A good and desirable tone-to-tone dyeing is consequently the case in particular for samples 3-4 and 3-5.

TABLE 1

| Sample | Stabiliser | Added quantity of stabiliser (%) | Coating with (wt. % relative to stabiliser) | Concentration of chlorine (mg/l) | Exposure time (h) | Maximum tensile force extension (%) | Maximum tensile force (cN) | Percentage of original max. tensile force |
|---|---|---|---|---|---|---|---|---|
| 1-1 | — | — | — | 0 | 0 | 534 | 65 | |
| | | | | 20 | 5 × 1 | 319 | 10 | 15 |
| | | | | 20 | 10 × 1 | 0 | 0 | 0 |
| 1-2 | zinc oxide | 3 | — | 0 | 0 | 568 | 63 | |
| | | | | 20 | 5 × 1 | 528 | 27 | 43 |
| | | | | 20 | 10 × 1 | 0 | 0 | 0 |
| 1-3 | $Mg_6Al_2(OH)_{16}CO_3 \cdot 5H_2O$ | 3 | 2% stearic acid | 0 | 0 | 549 | 60 | |
| | | | | 20 | 5 × 1 | 561 | 38 | 63 |
| | | | | 20 | 10 × 1 | 504 | 29 | 48 |
| 1-4 | $Mg_6Al_2(OH)_{16}CO_3 \cdot 5H_2O$ | 2 | 5% Baysilone oil MH 15 | 0 | 0 | 573 | 58 | |
| | | | | 20 | 5 × 1 | 533 | 32 | 55 |
| | | | | 20 | 10 × 1 | 462 | 21 | 36 |
| 1-5 | $Mg_6Al_2(OH)_{16}CO_3 \cdot 5H_2O$ | 3 | 5% Baysilone oil MH 15 | 0 | 0 | 553 | 60 | |
| | | | | 20 | 5 × 1 | 549 | 55 | 92 |
| | | | | 20 | 10 × 1 | 516 | 46 | 77 |
| 1-6 | $Mg_6Al_2(OH)_{16}CO_3 \cdot 5H_2O$ | 3 | 5% Baysilone oil AC 3303 | 0 | 0 | 565 | 66 | |
| | | | | 20 | 5 × 1 | 572 | 54 | 82 |
| | | | | 20 | 10 × 1 | 573 | 47 | 71 |
| 1-7 | $Mg_6Al_2(OH)_{16}CO_3 \cdot 5H_2O$ | 3 | 5% Baysilone oil GPW 2233 | 0 | 0 | 595 | 61 | |
| | | | | 20 | 5 × 1 | 597 | 45 | 74 |
| | | | | 20 | 10 × 1 | 603 | 42 | 69 |
| 1-8 | $Mg_6Al_2(OH)_{12}(CO_3)_3 \cdot 5H_2O$ | 3 | — | 0 | 0 | 597 | 63 | |
| | | | | 20 | 5 × 1 | 554 | 42 | 67 |
| | | | | 20 | 10 × 1 | 564 | 39 | 62 |
| 1-9 | $Mg_6Al_2(OH)_{12}(CO_3)_3 \cdot 5H_2O$ | 3 | 5% polydimethyl siloxane | 0 | 0 | 585 | 64 | |
| | | | | 20 | 5 × 1 | 567 | 56 | 88 |
| | | | | 20 | 10 × 1 | 557 | 50 | 78 |
| 1-10* | — | — | — | 0 | 0 | 465 | 63 | |
| | | | | 20 | 5 × 1 | 359 | 28 | 44 |
| | | | | 20 | 10 × 1 | 304 | 13 | 21 |
| 1-11* | $Mg_6Al_2(OH)_{16}CO_3 \cdot 5H_2O$ | 3 | 5% Baysilone oil MH 15 | 0 | | 466 | 68 | |
| | | | | 20 | | 454 | 60 | 88 |
| | | | | 20 | | 380 | 51 | 75 |

*polymer based on polyester

TABLE 2

| Sample a) | Stabiliser | Added quantity of stabiliser (%) | Coating with (wt. %) relative to stabiliser | Dyeing | Overall difference DE* b) |
|---|---|---|---|---|---|
| 2-1 | — | — | — | c) | 0 (ref. sample) |
| | | | | d) | 0 (ref. sample) |
| 2-2 | zinc oxide | 3 | — | c) | 3.1 |
| | | | | d) | 2.1 |
| 2-3 | $Mg_6Al_2(OH)_{16}CO_3 \cdot 5H_2O$ | 3 | 2% stearic acid | c) | 1.5 |
| | | | | d) | 0.6 |
| 2-4 | $Mg_6Al_2(OH)_{16}CO_3 \cdot 5H_2O$ | 3 | 5% Baysilone oil GPW 2233 | c) | 14.7 |
| | | | | d) | 12.9 |
| 2-5 | $Mg_6Al_6(OH)_{16}(CO_3)_3 \cdot 5H_2O$ | 3 | 5% polydimethyl siloxane | c) | 17.1 |
| | | | | d) | 18.3 | a) The polyurethanes are synthesised on the basis of polyethers;
b) light type: D 65 = daylight lamp;
c) 0.31% Telon yellow 3 RL; 0.32% Telon red FRL; 0.24% Telon blue BRL; 2.0% Levegal FTS; pH 5.0; 98° C./60 min;
d) 0.13% Telon orange AGT; 0.22% Telon ruby A5B; 0.20% Telon blue AFN; 1.0% Levegal FTS; 0.5% Avolan IS; pH 5.5; 98° C./60 min.

TABLE 3

| Sample a) | Stabiliser | Added quantity of stabiliser (%) | Coating with (wt. %) relative to stabiliser | Dye-ing | Overall difference DE* b) |
|---|---|---|---|---|---|
| poly-amide | | | | c) | 0 (ref. sample) |
| | | | | d) | 0 (ref. sample) |
| 3-1 | — | — | — | c) | 37.8 |
| | | | | d) | 44.4 |
| 3-2 | zinc oxide | 3 | — | c) | 34.6 |
| | | | | d) | 41 |
| 3-3 | $Mg_6Al_2(OH)_{16}CO_3 \cdot 5H_2O$ | 3 | 2% stearic acid | c) | 35.3 |
| | | | | d) | 42.5 |
| 3-4 | $Mg_6Al_2(OH)_{16}CO_3 \cdot 5H_2O$ | 3 | 5% Baysilone oil GPW 2233 | c) | 30.7 |
| | | | | d) | 38.1 |
| 3-5 | $Mg_6Al_6(OH)_{12}(CO_3)_3 \cdot 5H_2O$ | 3 | 5% polydimethyl siloxane | c) | 21 |
| | | | | d) | 28.4 | a) The polyurethanes are synthesised on the basis of polyethers;
b) light type: D 65 = daylight lamp;
c) 0.31% Telon yellow 3 RL; 0.32% Telon red FRL; 0.24% Telon blue BRL; 2.0% Levegal FTS; pH 5.0; 98° C./60 min;
d) 0.13% Telon orange AGT; 0.22% Telon ruby A5B; 0.20% Telon blue AFN; 1.0% Levegal FTS; 0.5% Avolan IS; pH 5.5; 98° C./60 min.

We claim:

1. Elastane fibers having increased chlorine resistance consisting of at least 85% segmented polyurethane, wherein the fibers contain finely divided hydrotalcites or other basic metal aluminium hydroxy compounds of the general formula (1)

$$M_{1-x}^{2+}Al_x(OH)_2A_{x/n}^{n-} \cdot mH_2O \quad (1)$$

wherein $M^{2+}$ stands for magnesium or zinc, $A^{n-}$ is an anion having valency number n and is selected from the group consisting of $OH^-$, $F^-$, $Cl^-$, $Br^-$, $CO_3^{2-}$, $SO_4^{2-}$, $HPO_4^{2-}$, silicate, acetate and oxalate, $0 < x \leq 0.5$ and $0 \leq m < 1$ and wherein said finely-divided hydrotalcites or other metal aluminium hydroxy compounds are coated with 0.1 to 30 wt. % polyorganosiloxanes, polyorganohydrogensiloxanes, or both.

2. Elastane fibers according to claim 1, wherein the polyorganosiloxanes are those of the general formula (8):

$$(R^5)_3SiO\text{—}(\text{—}SiR^1R^4O\text{—})_x\text{—}(\text{—}SiR^2R^7O\text{—})_y\text{—}(\text{—}SiR^3HO\text{—})_z\text{—}Si(R^6)_3 \quad (8)$$

in which x is a number from 0 to 500, y is a number from 0 to 300 and z is a number from 0 to 300, $R^1$, $R^2$, $R^3$, $R^4$, $R^5$ and $R^6$ independently of one another and each represents a saturated or unsaturated, optionally branched, alkyl residue having 1 to 4 C atoms, or an aryl residue having 6 to 9 C atoms, which is optionally alkyl-substituted, and $R^7$ represents an alkyl residue having 6 to 18 C atoms, or hydrogen.

3. Elastane fibers according to claim 2, wherein in formula (8) for the polyorganosiloxanes x is a number from 0 to 100, y is a number from 0 to 100, and z is a number from 0 to 100, and the sum x+y+z=25 to 300.

4. Elastane fibers according to claim 2, wherein in formula (8) for the polyorganosiloxanes x is a number from 3 to 500, y=0 and z=0.

5. Elastane fibers according to claim 1, wherein the polyorganohydrogensiloxanes are those of the general formula (13):

$$(R^2)_3SiO\text{—}(\text{—}SiR^1HO\text{—})_m\text{—}Si(R^3)_3 \quad (13)$$

whereby in formula (13) m=5 to 200 and the residues $R^1$, $R^2$, $R^3$ independently of one another each represents a saturated or unsaturated, optionally branched, alkyl residue having 1 to 4 C atoms, or an aryl residue having 6 to 9 C atoms, which is optionally alkyl-substituted, and polyorganosiloxanes and polyorganohydrogensiloxanes are present in a quantitative ratio between 4:1 and 1:4.

6. Polyurethane composition wherein the polyurethane contains finely divided hydrotalcites or other basic metal aluminium hydroxy compounds of the general formula (1)

$$M_{1-x}^{2+}Al_x(OH)_2A_{x/n}^{n-} \cdot mH_2O \quad (1)$$

wherein $M^{2+}$ stands for magnesium or zinc $A^{n-}$ is an anion having valency number n and is selected from the group consisting of $OH^-$, $F^-$, $Cl^-$, $Br^-$, $CO_3^{2-}$, $SO_4^{2-}$, $HPO_4^{2-}$, silicate, acetate and oxalate, and $0 < x \leq 0.5$ and $0 \leq m < 1$ and the finely divided hydrotalcites or other metal aluminium hydroxy compounds are coated with 0.1 to 30 wt. % polyorganosiloxanes, polyorganohydrogensiloxanes or both.

7. Polyurethane composition according to claim 6, wherein the polyorganosiloxanes are those of the general formula (8):

$$(R^5)_3SiO\text{—}(\text{—}SiR^1R^4O\text{—})_x\text{—}(\text{—}SiR^2R^7O\text{—})_y\text{—}(\text{—}SiR^3HO\text{—})_zSi(R^6)_3 \quad (8)$$

wherein x is a number from 0 to 500 y is a number from 0 to 300 and z is a number from 0 to 300, $R^1$, $R^2$, $R^3$, $R^4$, $R^5$ and $R^6$ independently of one another each represent a saturated or unsaturated, optionally branched, alkyl residue having 1 to 4 C atoms, or an aryl residue having 6 to 9 C atoms, which is optionally alkyl-substituted, and $R^7$ represents an alkyl residue having 6 to 18 C atoms, or hydrogen.

8. Polyurethane composition according to claim 7, wherein, in formula (8) for the polyorganosiloxanes x is a number from 0 to 100, y is a number from 0 to 100, and z is a number from 0 to 100, and the sum x+y+z=25 to 300.

9. Polyurethane composition according to claim 7, wherein, in formula (8) for the polyorganosiloxanes x is a number from 3 to 500, y=0 and z=0.

10. Polyurethane composition according to claim 6, wherein the polyorganohydrogensiloxanes are those of the general formula (13):

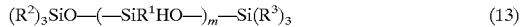

whereby in formula (13) m=5 to 200 and the residues $R^1$, $R^2$, $R^3$ independently of one another each represents a saturated or unsaturated, optionally branched, alkyl residue having 1 to 4 C atoms, or an aryl residue having 6 to 9 C atoms, which is optionally alkyl-substituted, and polyorganosiloxanes and polyorganohydrogensiloxanes are present in a quantitative ratio between 4:1 and 1:4.

11. Textile goods comprising the polyurethane fibers according to claim 1.

12. Textile goods according to claim 11, comprising further fibers selected from the group consisting of polyamide, polyester, polyacrylic, wool, silk, cotton and combinations thereof.

13. Elastane fibers having increased chlorine resistance consisting of at least 85% segmented poyurethane, wherein the fibers contain finely divided hydrotalcites or other basic metal aluminium hydroxy compounds of the general formula (2)

wherein s is a number from 1 to 15 t is a number from 1 to 8 u is a number from 1 to 40 w is a number from 0 to 20 and v is a number from 1 to 5 and $A^{2-}$ is an anion from the group consisting of $CO_3^{2-}$, $SO_4^{2-}$, $HPO_4^{2-}$, silicate and oxalate, and wherein the hydrotalcites or other metal aluminium hydroxy compounds are coated with 0.1 to 30 wt. %, polyorganosiloxanes, polyorganohydrogensiloxanes or both.

14. Elastane fibers according to claim 13, wherein the polyorganosiloxanes are those of the general formula (8):

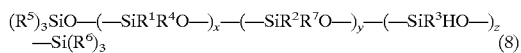

in which x is a number from 0 to 500, y is a number from 0 to 300 and z is a number from 0 to 300, $R^1$, $R^2$, $R^3$, $R^4$, $R^5$ and $R^6$ independently of one another each represents a saturated or unsaturated, optionally branched, alkyl residue having 1 to 4 C atoms, or an aryl residue having 6 to 9 C atoms, which is optionally alkyl-substituted, and $R^7$ represents an alkyl residue having 6 to 18 C atoms or hydrogen.

15. Elastane fibers according to claim 14, wherein in formula (8) for the polyorganosiloxanes x is a number from 0 to 100, y is a number from 0 to 100, z is a number from 0 to 100, and the sum x+y+z=25 to 300.

16. Elastane fibers according to claim 14, wherein in formula (8) for the polyorganosiloxanes x is a number from 3 to 500, y=0 and z=0.

17. Elastane fibers according to claim 13, wherein the polyorganohydrogensiloxanes are those of the general formula (13):

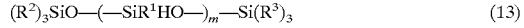

whereby in formula (13) m=5 to 200 and the residues $R^1$, $R^2$, $R^3$ independently of one another each represents a saturated or unsaturated, optionally branched, alkyl residue having 1 to 4 C atoms, or an aryl residue having 6 to 9 C atoms, which is optionally alkyl-substituted, and polyorganohydrogensiloxanes are present in a quantitative ratio between 4:1 and 1:4.

18. Polyurethane composition, wherein the polyurethanes contain finely divided hydrotalcites or other basic metal aluminium hydroxy compounds of the general formula (2)

wherein s is a number from 1 to 15 t is a number from 1 to 8 u is a number from 1 to 40 w is a number from 0 to 20 and v is a number from 1 to 5 and $A^{2-}$ is an anion selected from the group consisting of $CO_3^{2-}$, $SO_4^{2-}$, $HPO_4^{2-}$, silicate and oxalate, and wherein the hydrotalcites or other metal aluminium hydroxy compounds are coated with 0.1 to 30 wt. % polyorganosiloxanes, polyorganohydrogensiloxanes or both.

19. Polyurethane composition according to claim 18, wherein the polyorganosiloxanes are those of the general formula (8):

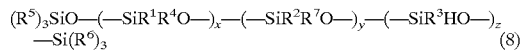

wherein x is a number from 0 to 500 y is a number from 0 to 300 and z is a number from 0 to 300, $R^1$, $R^2$, $R^3$, $R^4$, $R^5$ and $R^6$ independently of one another each represents a saturated or unsaturated, optionally branched, alkyl residue having 1 to 4 C atoms, or an aryl residue having 6 to 9 C atoms, which is optionally alkyl-substituted, and $R^7$ stands for any alkyl residue having 6 to 18 C atoms, or hydrogen.

20. Polyurethane composition according to claim 19, wherein in formula (8) for the polyorganosiloxanes x is a number from 0 to 100, y is a number from 0 to 100, z is a number from 0 to 100, and the sum x+y+z=25 to 300.

21. Polyurethane composition according to claim 19, wherein, in formula (8) for the polyorganosiloxanes, x is a number from 3 to 500, y=0 and z=0.

22. Polyurethane composition according to claim 18, wherein the polyorganohydrogensiloxanes are those of the general formula (13):

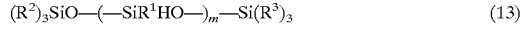

whereby in formula (13) m=5 to 200 and the residues $R^1$, $R^2$, $R^3$ independently of one another each represents a saturated or unsaturated, optionally branched, alkyl residue having 1 to 4 C atoms, or an aryl residue having 6 to 9 C atoms, which is optionally alkyl-substituted, and polyorganosiloxanes and polyorganohydrogensiloxanes are present in a quantitative ratio between 4:1 and 1:4.

23. Textile goods comprising the polyurethane fibers according to claim 13.

24. Textile goods according to claim 23, comprising further fibers selected from the group consisting of polyamide, polyester, polyacrylic, wool, silk, cotton and combinations thereof.

* * * * *